D. L. STILES.

Stove.

No. 9,337. Reissued Aug. 3, 1880.

Attest.

Chas. F. Duncan

John N. Hopkins

Inventor.

David L. Stiles.

Per R. T. Osgood,

Atty.

N. PETERS, PHOTO-LITHOGRAPHER, WASHINGTON, D. C.

UNITED STATES PATENT OFFICE.

DAVID L. STILES, OF ROCHESTER, NEW YORK.

STOVE.

SPECIFICATION forming part of Reissued Letters Patent No. 9,337, dated August 3, 1880.

Original No. 202,297, dated April 9, 1878. Application for reissue filed July 3, 1880.

*To all whom it may concern:*

Be it known that I, DAVID L. STILES, of the city of Rochester, in the county of Monroe and State of New York, have invented a certain new and useful Improvement in Stoves; and I do hereby declare that the following is a full, clear, and exact description of the same, reference being had to the accompanying drawings, in which—

Figure 1:
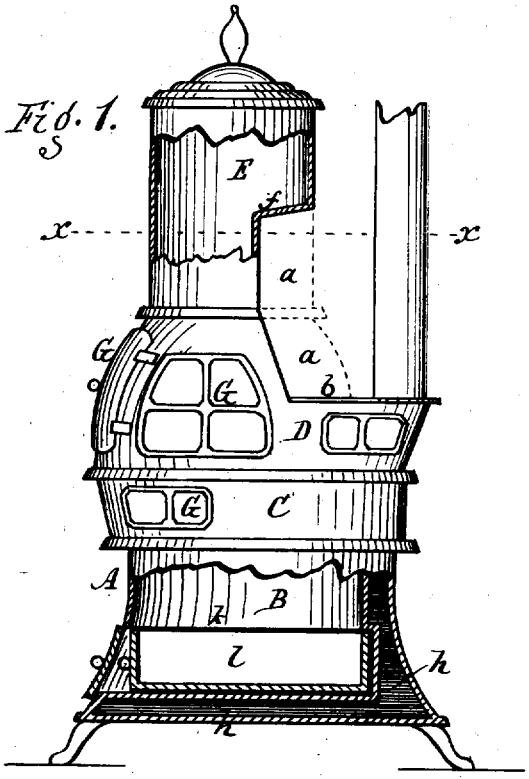
Figure 2:
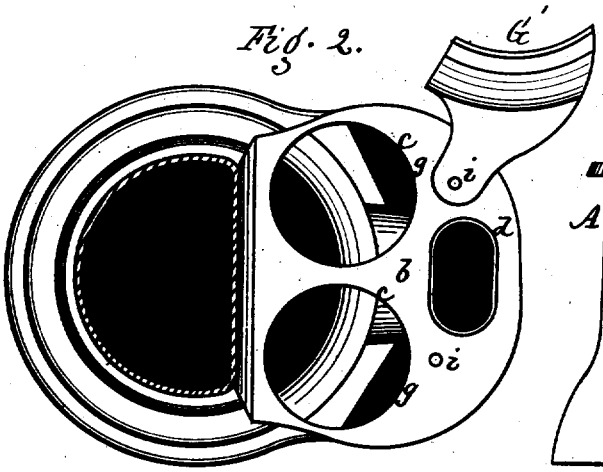
Figure 3:
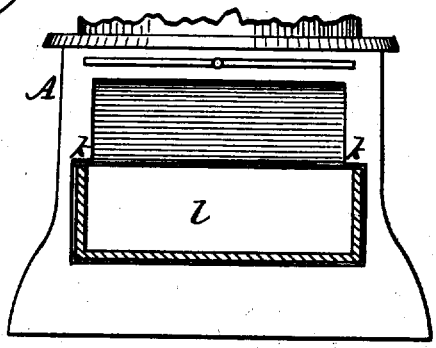

Figure 1 is a side elevation of my improved stove. Fig. 2 is a cross-section in line *x x*. Fig. 3 is a front elevation of the base of the stove, showing more particularly the shoulder in the ash-pit for holding the ash-pan in place.

My improvement relates to parlor-stoves adapted to cooking.

The invention consists in cutting away a a portion of the back of the stove, in such a manner as to form a cooking and boiling space, so that it may be located directly over the fire; also, in combining therewith covers or slides, which, when in place, preserve the perfect contour of the stove.

The improvements relate more particularly to what are known as "magazine" or "self-feeding" stoves.

In the drawings, A represents the base of the stove, in which is located the ash-pit B. C is the fire-pot section. D is the mica section or body above the fire-pot, and E is the magazine or fuel-chamber.

On the rear side the stove is cut away a part of its length, or so formed that a segment is taken out, leaving thereby a space or depression, *a*, at the bottom of which is a plate, *b*, having the boiler hole or holes *c c* and the pipe-hole *d*, as shown most clearly in Fig. 2.

The depth of the section taken away may be greater or less, but is usually and preferably about one-third the diameter of the fire-pot.

The novelty in this part of my invention consists in thus cutting away a portion of the rear part of the stove, by which means not only is sufficient space provided for cooking purposes and for the boiler-holes and the insertion therein of the ordinary articles of stove-furniture, but these boiler-holes are brought directly over the fire in the rear part of the fire-pot, and in close proximity thereto, which, so far as I am aware, has never before been done, and the fire is thus made effective.

In the rear of the fire-pot are diving flues *g g*, which, after the heat has come directly under the boiler-holes, carry the heat downward into the hollow bottom *h* of the stove, whence it is carried up again through a central flue into the escape-pipe.

The rear of the stove is provided with covers G′ G′, which are arranged to open and close either by being pivoted, as shown at *i*, to the bottom plate, *b*, as shown, or by sliding out and in, or by some other suitable means. When open these covers leave the space at the rear of the stove entirely free and unimpeded; but they are of such shape that when closed, as shown by the dotted lines, Fig. 1, they cover this space and preserve the symmetrical contour of the stove, so that the presence of the inclosed space could hardly be detected. The space thus arranged answers for boiling, cooking, and heating purposes.

I am aware that stoves have before been provided at the rear with devices for containing boiler-holes; but, so far as I am aware, it has been by building out from the rear of the stove, producing an unsightly projection and destroying the symmetry of the stove, at the same time obtaining but a small amount of the heat. By the construction before described I obviate these objections.

In this stove the ash-pit is used as an oven, being made effective for that purpose by the use of a diaphragm, slide, or valve interposed between the fire and the ash-pit, as described in my patent of February 1, 1870. To make the oven still more effective, by preserving cleanliness, I construct the body of the ash-pit with an overhanging shoulder or ledge, *k*, which extends the whole length on each side at the proper height to receive the ash-drawer *l* closely beneath it, as shown in Fig. 3. As the drawer fits closely the ashes, as they drop, are all thrown over into the drawer, and none can remain in the corners of the ash-pit. Hence, when the ash-pit is to be used as an oven, all that is necessary is simply to close the slide between the ash-pit and the fire and remove the drawer, leaving the ash-pit entirely free. The overhanging shoulder or ledge is effective in other stoves where the ash-pit is not used as an oven.

Having thus described my invention, what

I claim as new, and desire to secure by Letters Patent, is—

1. A parlor-stove having a space, *a*, formed in the rear and directly above the fire-pot, said space forming a cooking and boiling space, as herein shown and described.

2. In combination with the space *a*, formed in the back of the stove, the swinging or sliding covers G′ G′, arranged to be opened and closed, and when closed to cover and hide the space *a* and preserve the proper form of the stove, as herein shown and described.

DAVID L. STILES.

Witnesses:

R. F. OSGOOD,

HENRY E. WHITE.